J. H. POTTS.
Adjustable Mechanism for Dividers, Compasses and Calipers.

No. 164,209.  Patented June 8, 1875.

Witnesses:
Oric. Payson
Geo. H. Martin

Inventor
Joseph H. Potts

UNITED STATES PATENT OFFICE

JOSEPH H. POTTS, OF PENNINGTONVILLE, PENNSYLVANIA.

IMPROVEMENT IN ADJUSTABLE MECHANISMS OF DIVIDERS, COMPASSES, AND CALIPERS.

Specification forming part of Letters Patent No. 164,209, dated June 8, 1875; application filed February 15, 1875.

*To all whom it may concern:*

Be it known that I, JOSEPH HUNT POTTS, of Penningtonville, State of Pennsylvania, have invented an Improvement in the Adjusting Mechanisms of Dividers, Compasses, and Calipers, of which the following is a specification:

Wing-compasses require both hands to set and unset them, preventing the holding in the hand of small work to measure and lay it off.

Figure 1:
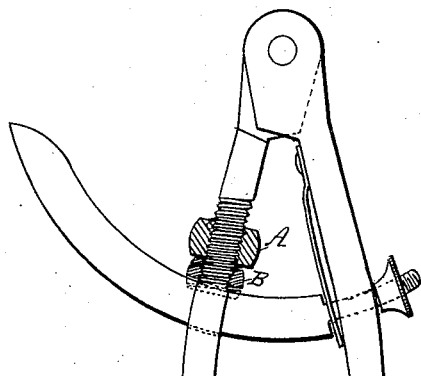

In this improvement the compasses shown in Figure 1 are operated by grasping the nut A between the forefinger and thumb, resting the point of the other leg upon the work, leaving one hand free.

Calipers or compasses retained in position by the friction of the joint often become too stiff by rust or too loose by wear. In this arrangement the nut A, Fig. 1, can be screwed down upon the spring or elastic washer B, producing any required amount of friction to the movement of the legs, or it can be further tightened, so as to retain the legs in a set position.

Figure 2:
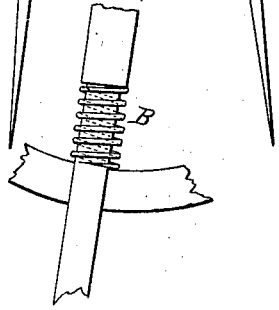

With calipers and compasses not required to be rigidly set, the nut A, Fig. 1, can be omitted, and the spring B used alone, the pressure of the spring against the wing producing the necessary friction, as shown in Fig. 2; also, if the wing B is made true in width the spring or elastic washer B can be omitted, and nut A screwed down upon the wing.

This improvement is of great use and advantage when applied to drawing or drafting compasses. The nut A, when unscrewed, allows the greatest freedom of motion to the points—therefore can be set more quickly, and with greater accuracy.

I claim as my invention—

1. The combination, with dividers and compasses, of the nut A and thread upon which it works, both encircling the leg of the dividers, as shown in Fig. 1, and to operate as and for the purpose described and set forth.

2. The combination, with compasses, dividers, and calipers, of the spring B.

3. The adjusting mechanism of compasses, dividers, and calipers, consisting of the nut A and spring B, or their equivalent, to operate substantially as and for the purpose above described.

JOSEPH HUNT POTTS.

Witnesses:
   ORIC PAXSON,
   GEO. H. MARTIN.